United States Patent
Nikolauk et al.

(10) Patent No.: US 12,370,943 B2
(45) Date of Patent: Jul. 29, 2025

(54) STEERING WHEEL AND LIGHTBAR ASSEMBLY

(71) Applicant: Joyson Safety Systems Acquisition LLC, Auburn Hills, MI (US)

(72) Inventors: Jason Nikolauk, Macomb, MI (US); Jason Peters, Lapeer, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 18/750,254

(22) Filed: Jun. 21, 2024

(65) Prior Publication Data

US 2024/0424985 A1 Dec. 26, 2024

Related U.S. Application Data

(60) Provisional application No. 63/509,941, filed on Jun. 23, 2023.

(51) Int. Cl.
*B60Q 3/283* (2017.01)
*B62D 1/06* (2006.01)

(52) U.S. Cl.
CPC .............. *B60Q 3/283* (2017.02); *B62D 1/06* (2013.01)

(58) Field of Classification Search
CPC ................................ B60Q 3/283; B62D 1/046
USPC ........................................................ 362/488
See application file for complete search history.

(56) References Cited

U.S. PATENT DOCUMENTS

| | | | |
|---|---|---|---|
| 9,233,638 B2 | 1/2016 | Lisseman et al. | |
| 9,873,446 B2 | 1/2018 | Gardner et al. | |
| 10,780,908 B2 | 9/2020 | Gardner et al. | |
| 11,180,079 B2 | 11/2021 | Marc et al. | |
| 11,242,080 B2 | 2/2022 | Gardner et al. | |
| 11,267,499 B1 | 3/2022 | Matsu et al. | |
| 11,390,211 B2 * | 7/2022 | Kihara | B60Q 3/62 |
| 11,834,093 B2 | 12/2023 | Gardner et al. | |
| 12,103,460 B2 | 10/2024 | Liang et al. | |
| 2022/0063699 A1 * | 3/2022 | Kojima | B60Q 3/283 |
| 2024/0199108 A1 * | 6/2024 | Miyata | B60Q 3/14 |

* cited by examiner

*Primary Examiner* — Laura K Tso
(74) *Attorney, Agent, or Firm* — Meunier Carlin & Curfman LLC

(57) ABSTRACT

A steering wheel and lightbar assembly includes a steering wheel having a rim. The rim includes an armature having a foamed portion and a non-foamed portion. A carrier is coupled to the rim and a printed circuit board (PCB) is disposed between the carrier and the rim. At least one light source is coupled to the PCB and may be a visible light or infrared light producing light source, for example. A lens is coupled to the carrier and covers the light source. The foamed portion of the armature comprises a first surface facing in a first direction and a second surface facing in a second direction, wherein the second direction is different than the first direction. The carrier comprises a platform adjacent the second surface and a gap is defined between the lens and the platform. An outer skin is tucked into the gap.

20 Claims, 15 Drawing Sheets

STEERING WHEEL AND LIGHTBAR ASSEMBLY

CROSS REFERENCE TO RELATED APPLICATIONS

This application claims the benefit of U.S. Provisional Patent Application No. 63/509,941, filed on Jun. 23, 2023, the entire contents of which are incorporated herein by reference.

TECHNICAL FIELD

The present disclosure relates to safety devices for passenger vehicles. In particular, the disclosure relates to a steering wheel and lightbar assembly. Passenger vehicles may include, for example, automobiles, boats, trains, aircraft, and spacecraft.

BACKGROUND

In modern vehicles that require human control, such as automobiles, there is an increasing number of distractions in the vehicle cabin. Touch screens, switches and knobs, and other human machine interface (HMI) devices can distract a vehicle operator from properly operating the vehicle. Additionally, some modern automobiles have semi-autonomous or fully autonomous driving features. In these vehicles, it is important to know the operator is alert and able to give up or take back control of the vehicle at any time. Technology such as driver monitoring cameras or "hands-on" steering wheel sensors can help detect whether the operator is alert and undistracted, but these technologies only passively monitor the operator's status.

It is therefore important to provide vehicle operators with warnings or other informational alerts to ensure the operator is fully aware of vehicle status and environmental conditions. For example, it is important in automobiles with autonomous driving features that the operator is aware the autonomous driving system is operating properly or, conversely, is experiencing an event where it is necessary for the operator to take back manual control. In some vehicles, a lightbar is installed on the vehicle steering wheel to provide light-based alerts directly to the operator. However, lightbars can be difficult to implement due to constraints in size, cost, and appearance when installed on a vehicle steering wheel. Therefore, there is a need for an improved lightbar design that offers robust performance, low cost, and an aesthetically pleasing appearance.

SUMMARY

In some implementations, a steering wheel and lightbar assembly comprises a steering wheel comprising a rim. The rim comprises an armature having a foamed portion and a carrier is coupled to the rim. A printed circuit board (PCB) is disposed between the carrier and the rim and a light source is coupled to the PCB. A lens is coupled to the carrier. The foamed portion of the armature comprises a first surface facing in a first direction and a second surface facing in a second direction, wherein the second direction is different than the first direction. The carrier comprises a platform adjacent the second surface and a gap is defined between the lens and the platform. An outer skin is tucked into the gap.

In some implementations, the second direction is perpendicular to the first direction.

In some implementations, the armature further comprises a non-foamed portion and the PCB comprises a first surface and a second surface. The light source is directly coupled to the first surface and the second surface is adjacent the non-foamed portion of the armature.

In some implementations, the light source comprises a plurality of light sources. In some implementations, the light source comprises a plurality of visible light producing light sources. In some implementations, the light source comprises at least one infrared light producing light source. In some implementations, the plurality of light sources comprises at least one visible light producing light source and at least one infrared light producing light source.

In some implementations, the carrier further comprises a tab adjacent the first surface of the foamed portion of the armature and extending in the first direction. In some implementations, the tab comprises a protrusion and the lens comprises a mounting hole. The protrusion extends into the mounting hole to couple the lens to the carrier. In some implementations, the lens further comprises an end surface adjacent the gap. The outer skin is tucked between the end surface of the lens and the platform.

In some implementations, the platform directly abuts the second surface of the foamed portion of the armature.

In some implementations, the carrier is coupled to the non-foamed portion of the armature.

In some implementations, the foamed portion of the armature further comprises a plurality of cavities. In some implementations, the lens further comprises a plurality of clips. The plurality of clips each comprise a clip hole. In some implementations, the carrier further comprises a plurality of openings and a plurality of protrusions. At least one of the plurality of protrusions is adjacent to each of the plurality of openings. In some implementations, the plurality of clips extend through the plurality of openings and into the plurality of cavities. The plurality of protrusions extend into the clip holes of the plurality of clips to couple the lens to the carrier. In some implementations, the carrier further comprises a plurality of prongs extending into the plurality of openings. The plurality of prongs directly abut the plurality of clips.

In some implementations, the carrier further comprises a hook that engages the armature.

In some implementations, an arcuate shaped slot is formed between the lens and the carrier along at least a portion of a circumference of the rim and the outer skin is tucked into the arcuate shaped slot. In some implementations, the lens comprises an arcuate shaped surface adjacent the arcuate shaped slot, wherein the arcuate shaped surface tapers from an exit of the arcuate shaped slot to an entrance of the arcuate shaped slot such that a width of the entrance of the arcuate shaped slot is smaller than a width of the exit of the arcuate shaped slot.

BRIEF DESCRIPTION OF THE DRAWINGS

The drawings are merely exemplary to illustrate steps, structure, and certain features that can be used singularly or in combination with other features. The disclosure should not be limited to the implementations shown.

DETAILED DESCRIPTION

The present disclosure relates to safety devices for passenger vehicles. The devices, assemblies, and systems disclosed herein provide for a steering wheel and lightbar assembly capable of providing light-based alerts to a vehicle operator. In one example, the steering wheel and lightbar assembly is used in automobiles. Due to size constraints on the steering wheel in most automobiles, it is desirable to use a relatively large lightbar to ensure maximum visibility by the operator. However, robust assembly and proper, long-term aesthetic appearance can be difficult to obtain when increasing the size of the lightbar. In particular, steering wheels including an outer skin, such as a leather or synthetic leather wrapping, require extra support in certain regions so that the outer skin will remain in position during the life of the vehicle and not sag or bulge. By using a carrier to provide structural support in the regions where the outer skin is tucked, degradation of appearance can be prevented.

Figure 1:
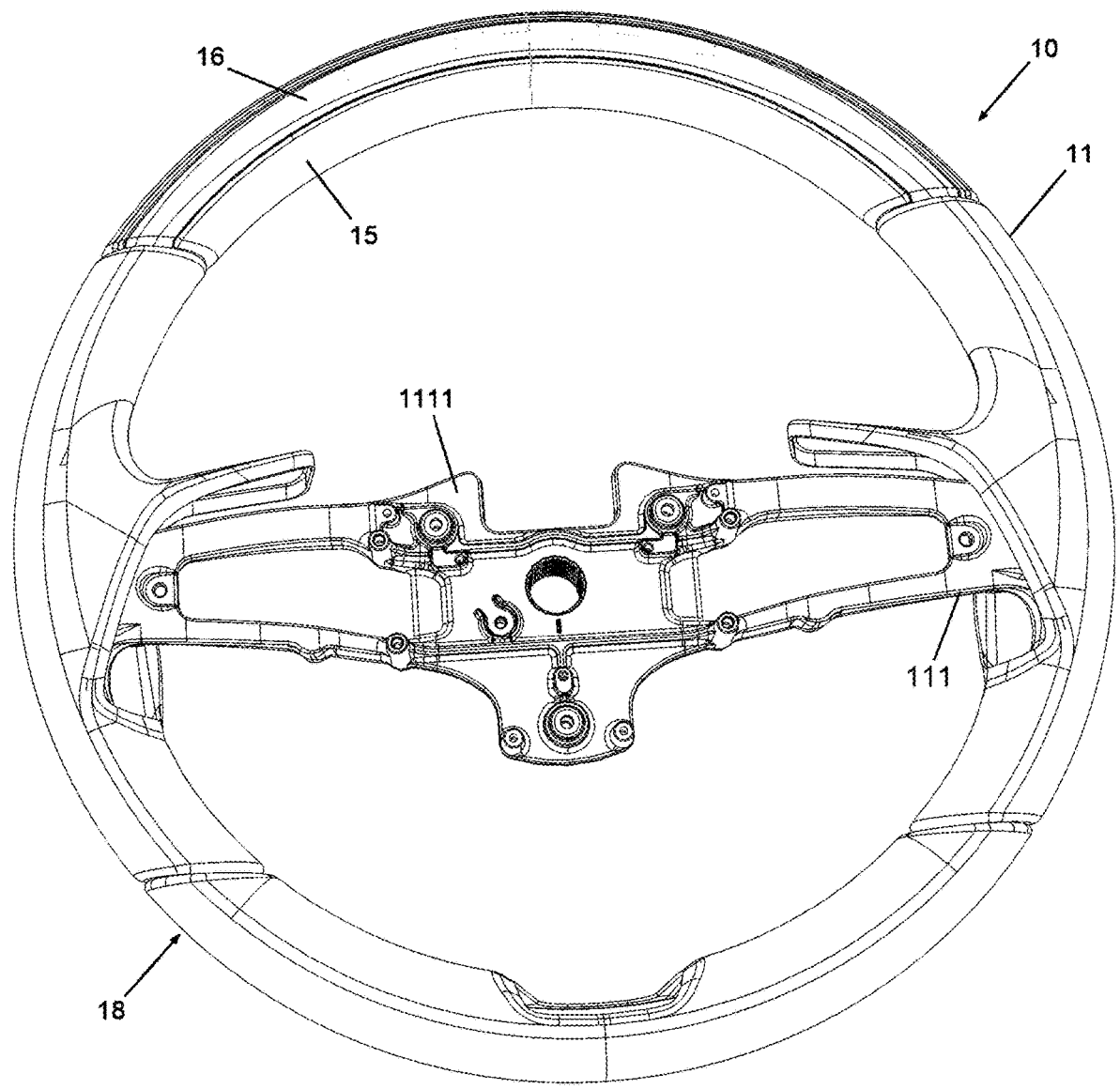
FIG. 1 is a perspective view of a steering wheel and lightbar assembly.

As shown in FIG. 1, one implementation of a steering wheel and lightbar assembly 10 comprises a steering wheel 18 comprising a rim 11. The rim 11 can include an armature 111—which is partially shown in FIG. 1 and which is also more clearly illustrated in FIGS. 7 and 8—that includes a foamed portion 112 and a non-foamed portion 113. The armature 111 may be made from a suitable metal, such as aluminum or magnesium, or a metal alloy, in order to meet vehicle manufacturer and safety requirements related to strength and rigidity. The armature 111 comprises a central hub portion 1111 surrounded by the rim 11. The rim 11 may be circular in shape or include features such as a flat bottom and/or flat top that makes the rim 11 noncircular. An outer skin 15 is wrapped about the rim 11 and adjacent a lens 16. As described herein, the outer skin 15 may be formed of leather, synthetic leather, or any other suitable material (e.g., any material commonly used in automotive interiors). As shown in FIG. 1, the lens 16 extends from twelve o'clock to approximately the "ten and two" positions on the rim 11. In other implementations, the lens may extend further than or less than the ten and two positions.

Figure 2:
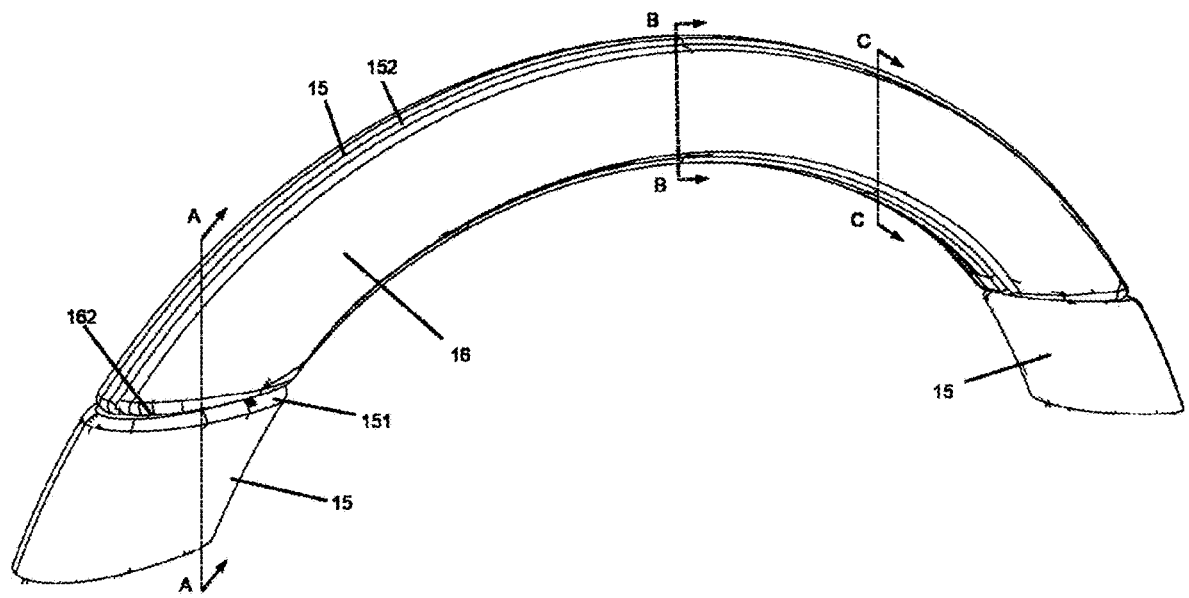
FIG. 2 is a partial view of a steering wheel and lightbar assembly.
Figure 3:
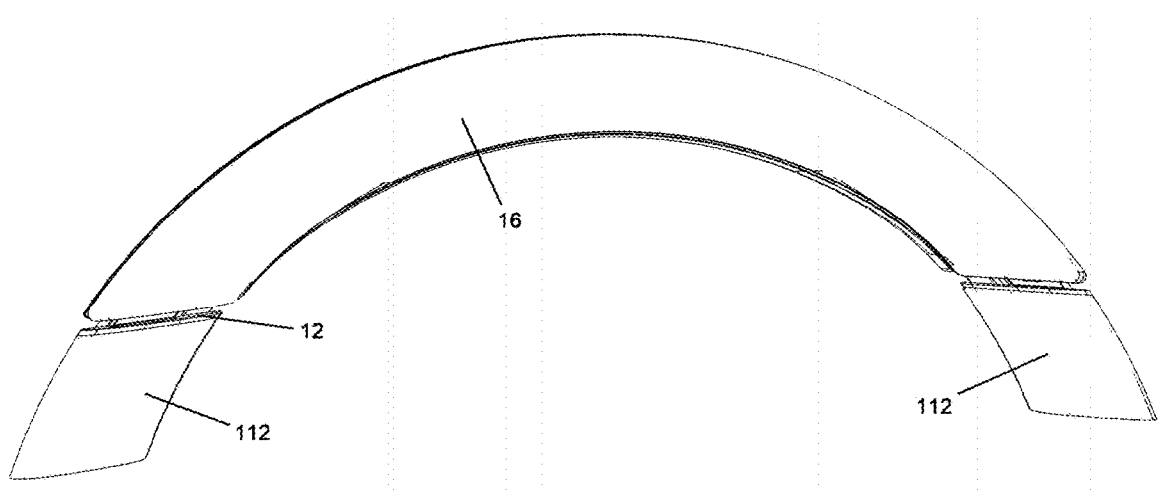
FIG. 3 is a perspective view of the assembly of FIG. 2 with an outer skin removed.
Figure 4:
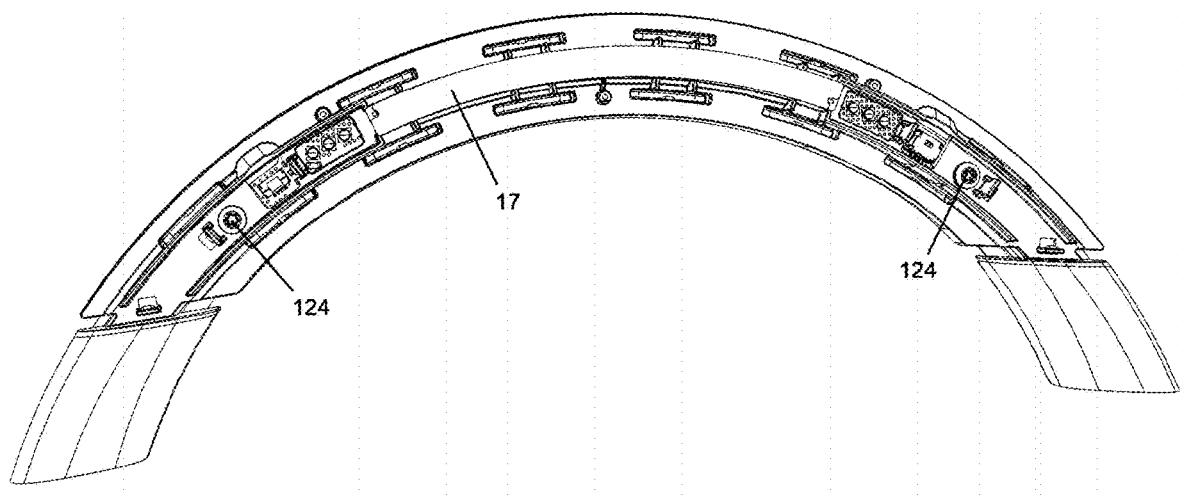
FIG. 4 is a perspective view of the assembly of FIG. 3 with a lens removed.

Referring now to FIG. 2, the lens 16, typically an at least partially transparent or translucent plastic material, may additionally extend across the entire front face of the rim 11 along the twelve o'clock to six o'clock vertical direction, the front face being the side of the rim 11 facing a vehicle occupant. As shown in FIG. 3, with the lens 16 and outer skin 15 removed, a carrier 12 is coupled to the rim 11. The carrier 12 may be made from plastic material or metal. Specifically, the carrier 12 is coupled to the armature 111 via fasteners 124, which may be threaded screws, for example, as shown in FIG. 4. Fasteners 124 extend through the carrier 12 and into fastener openings 114 in the armature 111. The fastener openings 124 are non-foamed and therefore part of the non-foamed portion 113 of the armature 111.

Figure 11:
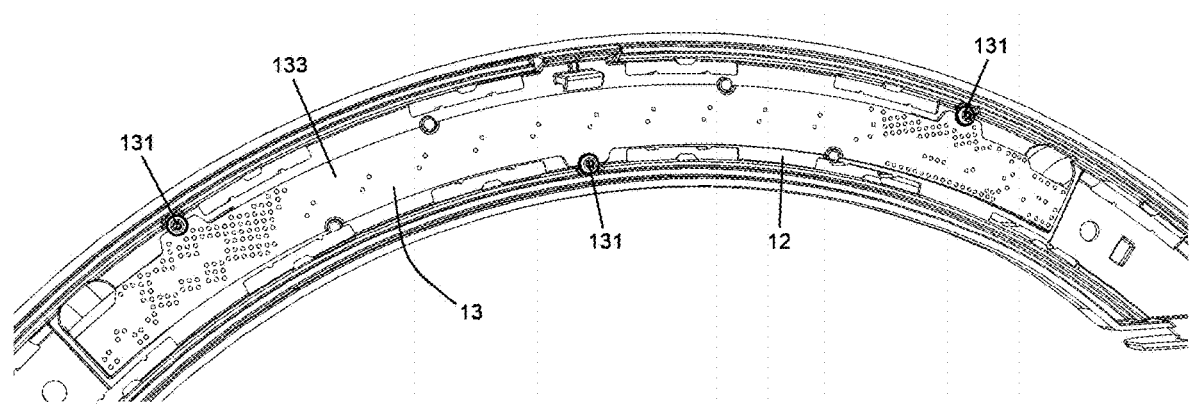
FIG. 11 is a view of the carrier of FIG. 10 coupled to the PCB of FIG. 5.

A PCB 13 is coupled to the carrier 12 by fasteners 131, as shown in FIG. 11, and is disposed between the carrier 12 and the armature 111. The PCB 13 comprises a first surface 132 and a second surface 133, wherein a light source 14 is coupled to the first surface 132 and the second surface 133 is disposed adjacent the non-foamed portion 113 of the armature 111. In some implementations, a thermal pad 134 may be disposed between the second surface 133 of the PCB 13 and the non-foamed portion 113 of the armature 111, allowing for heat transfer from the PCB 13 to the armature 111. The thermal pad 134 may be any thermally conductive material capable of transferring heat from the PCB 13, as generated by the light source 14, to the armature 111, including a gel, adhesive, or a metal with high thermal conductivity.

Figure 5:
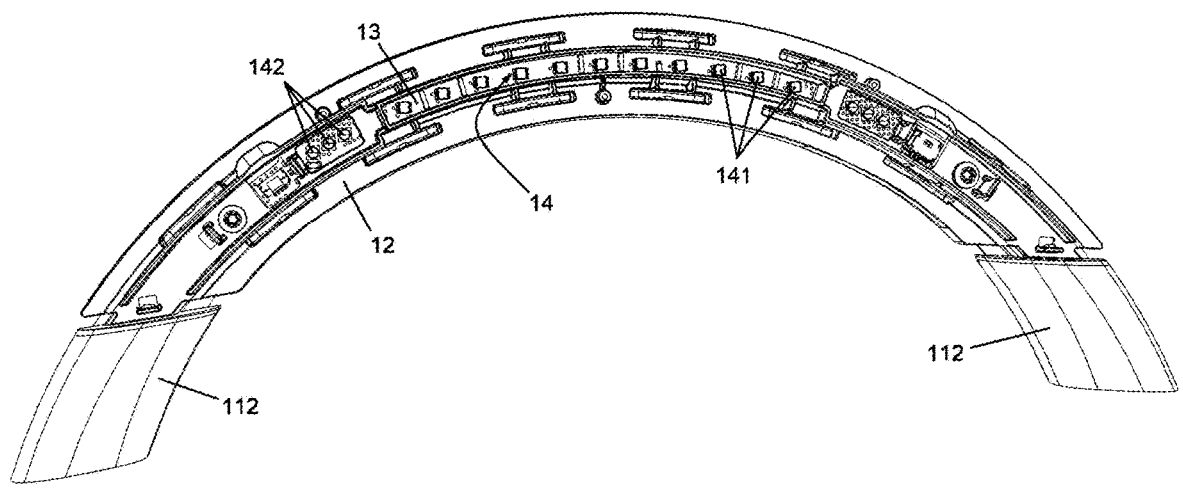
FIG. 5 is a perspective view of the assembly of FIG. 4 with a light diffusing film removed.
Figure 12:
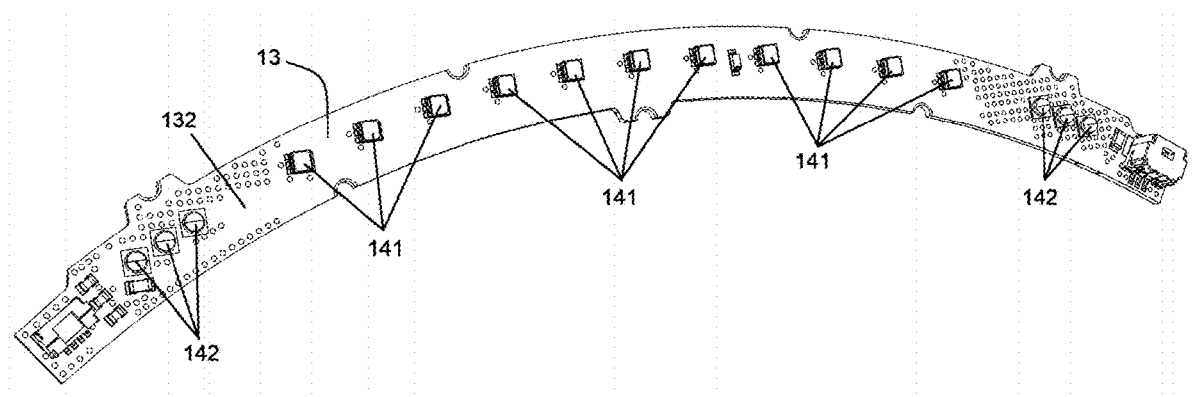
FIG. 12 is a view of a front side of the PCB of FIG. 11.
Figure 13:
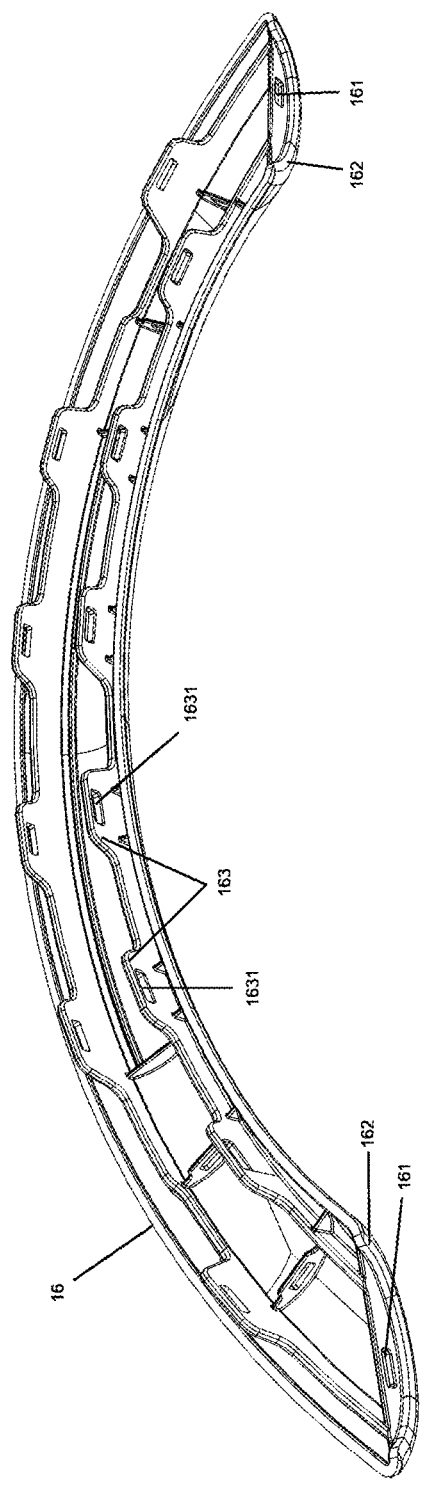
FIG. 13 is a perspective view of a rear side of the lens of FIG. 3.
Figure 14:
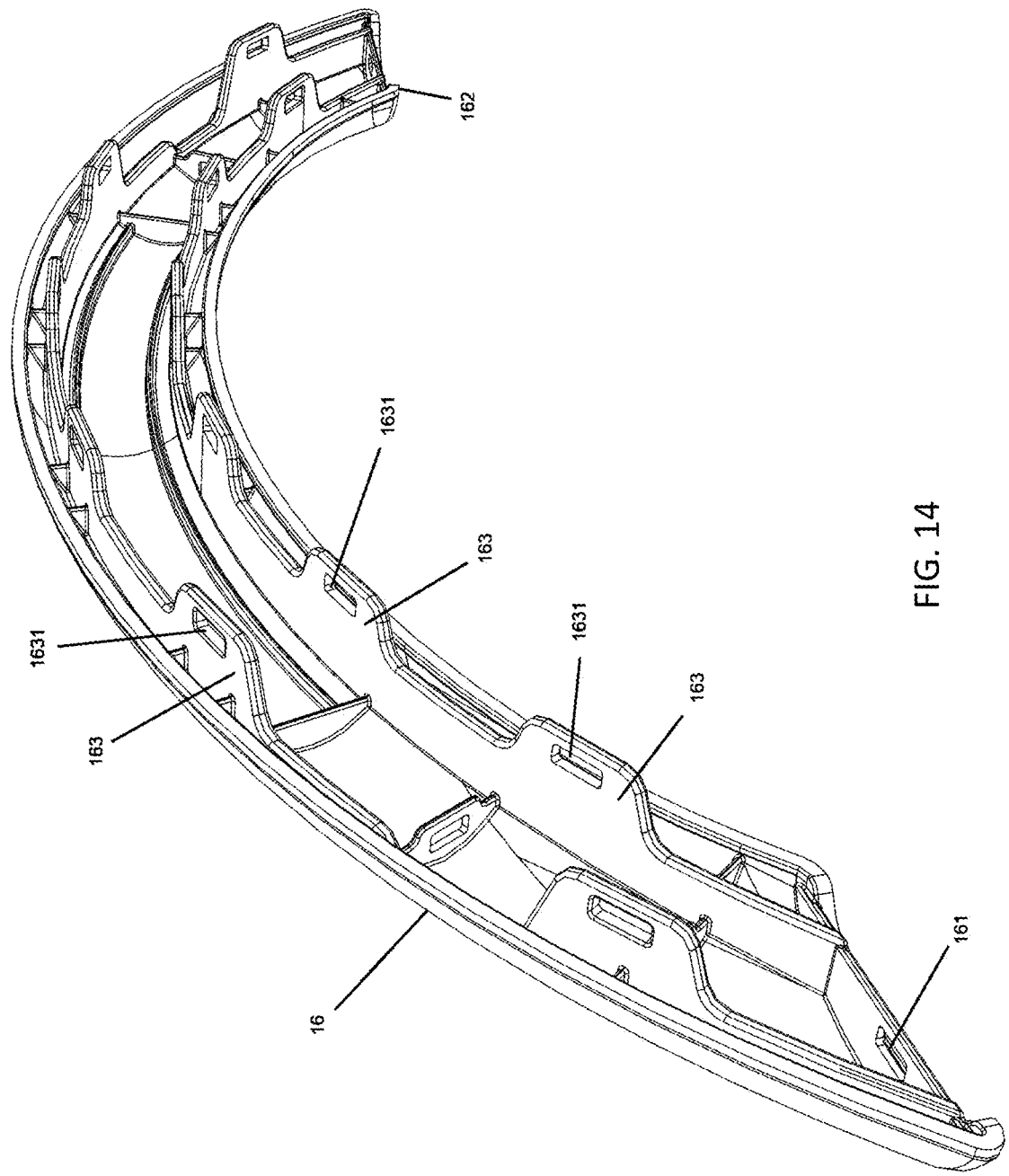
FIG. 14 is a perspective view of the lens of FIG. 13.

In some implementations, as shown in FIG. 5, the light source 14 includes a plurality of (e.g., more than one) light sources 14, such as a plurality of light emitting diodes (LEDs). The plurality of light sources 14 may comprise a plurality of visible light producing light sources 141 as well as at least one infrared light producing light source 142. However, it should be understood that the light source 14 can generally include any number and/or combination of visible or infrared light producing light sources. As seen in FIG. 12, for example, eleven visible light producing light sources 141 and six infrared light producing light sources 142 are coupled to the first surface 132 of the PCB 13. However, the present disclosure is not intended to be limiting in this regard. Other implementations are contemplated where the light source 14 includes: multiple visible light producing light sources 141 and no infrared light producing light source 142; multiple infrared light producing light sources 142 and no visible light producing light source 141; or any combination of visible light producing light sources 141 and infrared light producing light sources 142.

Generally, visible light is useful for providing information to the operator of the vehicle, such as status information in green (all systems are good) or red (something about the vehicle needs attention). As shown in FIG. 4, a light diffusing film 17 may be coupled to the carrier 12 adjacent the visible light producing light sources 141, so that light appears uniform and consistent to the vehicle operator. On the other hand, infrared light is useful in combination with an imager-based occupant monitoring system. The infrared light producing light sources 142 emit infrared light onto the vehicle operator so that an infrared-based imager can receive detailed images of the operator no matter the ambient lighting conditions of the vehicle and without distracting the operator.

Figure 6:
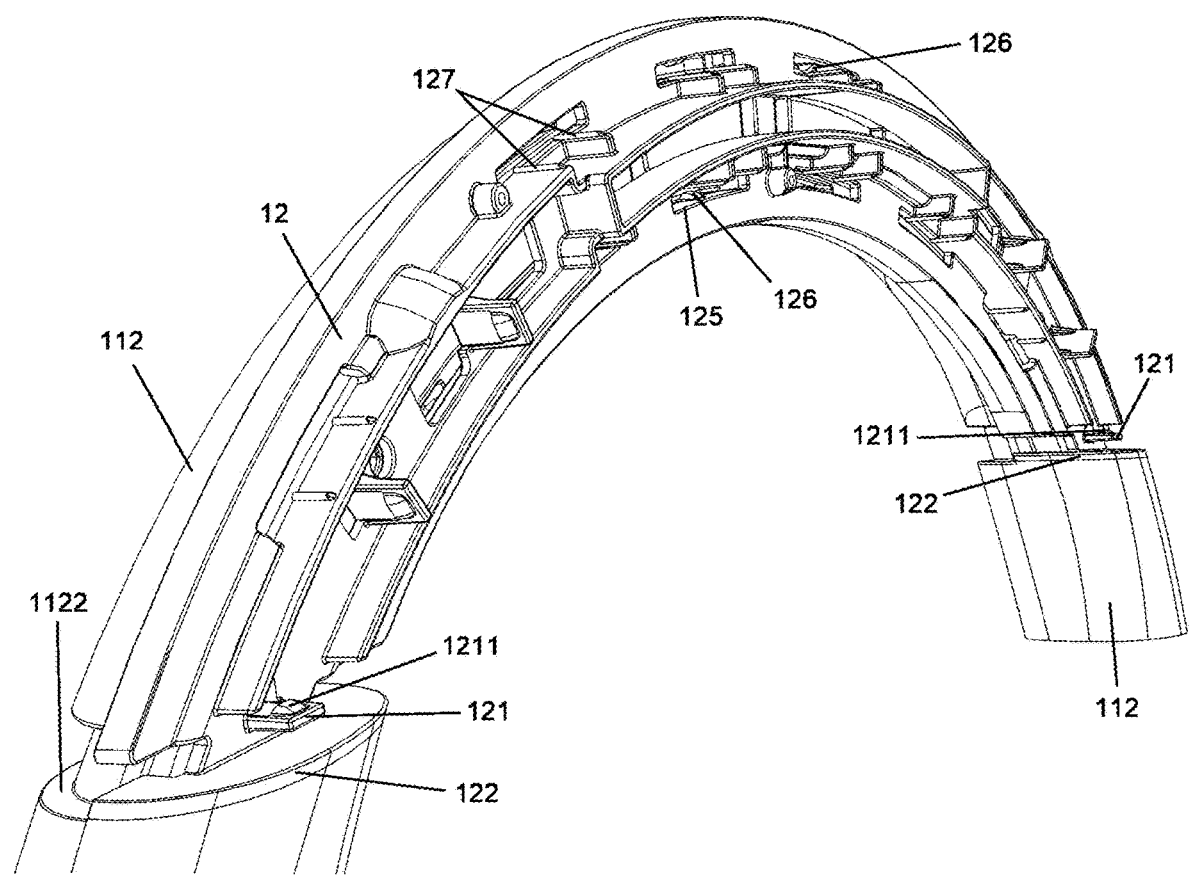
FIG. 6 is a perspective view of the assembly of FIG. 5 with a printed circuit board removed.
Figure 7:
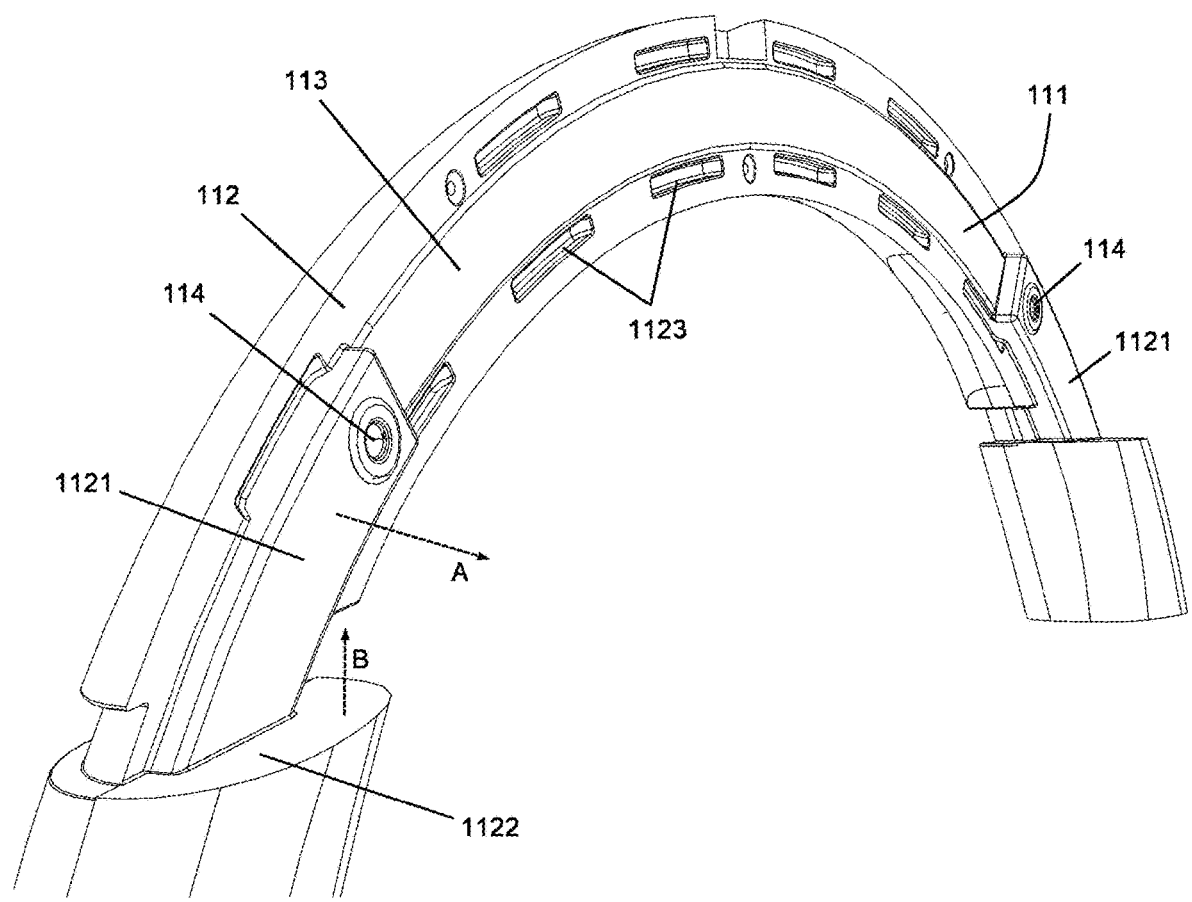
FIG. 7 is a perspective view of the assembly of FIG. 6 with a carrier removed.
Figure 8:
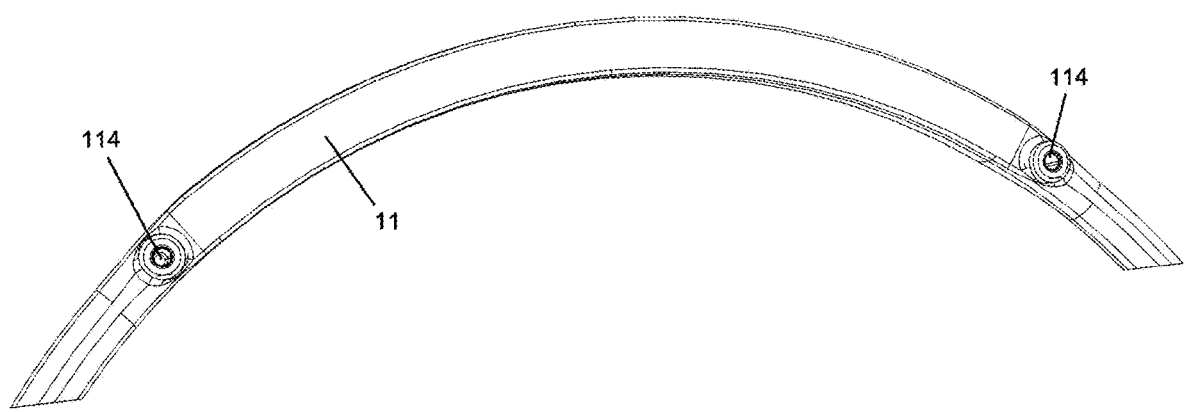
FIG. 8 is a perspective view of the assembly of FIG. 7 with a foam removed.

As mentioned above, the armature 111 comprises a foamed portion 112 and a non-foamed portion 113. The foam may be a polyurethane based foam which is injection molded around the armature 111, providing additional rigidity and structure to the armature 111. As best shown in FIG. 7, the foamed portion 112 comprises a first surface 1121 facing in a first direction A and a second surface 1122 facing in a second direction B, where the second direction B is different than the first direction A. In some implementations, the first direction A is perpendicular to the second direction B. As mentioned above, the carrier 12 is coupled to the armature via fasteners 124. As best shown in FIG. 6, the carrier 12 comprises a platform 122 adjacent to the second surface 1122. In some implementations, the platform 122 directly abuts the second surface 1122. The foamed portion 112 further comprises cavities 1123 and the carrier 12 further comprises openings 125 that are adjacent to and aligned with the cavities 1123 when the carrier 12 is coupled to the armature 111.

Referring now to FIGS. 10, 13-14, and 16-17, the lens 16 comprises a plurality of clips 163 that extend through the openings 125 of the carrier 12 and into the cavities 1123 of the foamed portion 112 of the armature 111. The carrier 12 comprises protrusions 126 adjacent to the openings 125 that extend into clip holes 1631 defined by the clips 163 to couple the lens 16 to the carrier 12. The carrier further comprises prongs 127 that extend at least partially into the openings 125 and directly abut the clips 163 to bias the clips 163 toward the protrusions 126. This biasing ensures the clips 163 remain engaged with the protrusions 126 and maintain the coupling of the lens 16 to the carrier 12, as well as limiting vibration which can cause undesirable noise in the vehicle cabin. In some implementations, the protrusions 126 may comprise a ramped surface 1261 and a shoulder 1262, wherein the ramped surface 1261 facilitates installation of the lens 16 by deflecting the clip 163 away from the protrusion 126, as the lens 16 is being installed, until the ramped surface 1261 is entirely within the clip hole 1631, whereby the clip 163 then snaps back to lock the clip 163 against the shoulder 1262.

Figure 9:
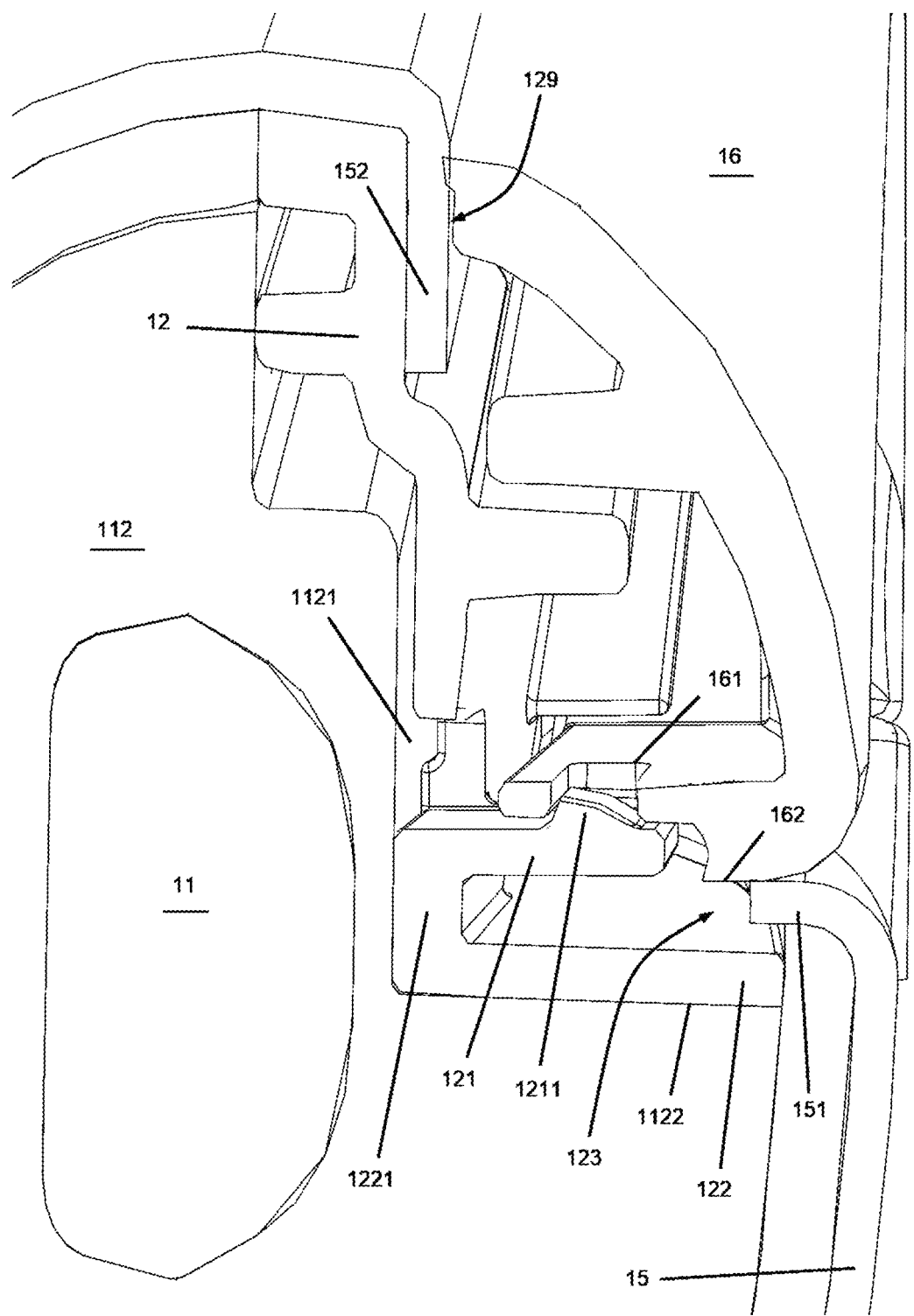
FIG. 9 is a cross sectional view of the assembly of FIG. 2 taken along the line A-A as shown in FIG. 2.

In some implementations, the lens 16 also, or alternatively, defines at least one mounting hole 161 and the carrier comprises a tab 121 having a tab protrusion 1211. The tab 121 extends in the direction A while the tab protrusion 1211 extends in the direction B. The lens 16 and carrier 12 can be coupled together in the same fashion as described above, wherein the mounting hole 161 is engaged by the tab protrusion 1211, thus locking the lens 16 to the carrier 12. When coupled together, as best shown in FIG. 9, a gap 123 is defined between the platform 122 and an end surface 162 of the lens 16.

Referring again to FIG. 9, an end portion 151 of the outer skin 15 is tucked into the gap 123 between the end surface 162 of the lens 16 and the platform 122 of the carrier 12. The platform 122 and the tab 121 are integrally formed and connected together by a wall 1221 which abuts the first surface 1121 of the foamed portion 112 of the armature 11. The carrier 12, via the platform 122 and the wall 1221, provide structural support for the outer skin 15 where it is tucked into the gap 123. This support prevents the outer skin 15 from sagging or bulging or otherwise taking on an aesthetically displeasing appearance. In some implementations, the end portion 151 may be tucked into the groove 123 via an interference fit. In some implementations, the end portion 151 may be tucked into the groove 123 and glued in place using an adhesive applied to the end portion 151, to the end surface 162 of the lens 16, and/or to the platform 122 of the carrier 12.

Figure 17:
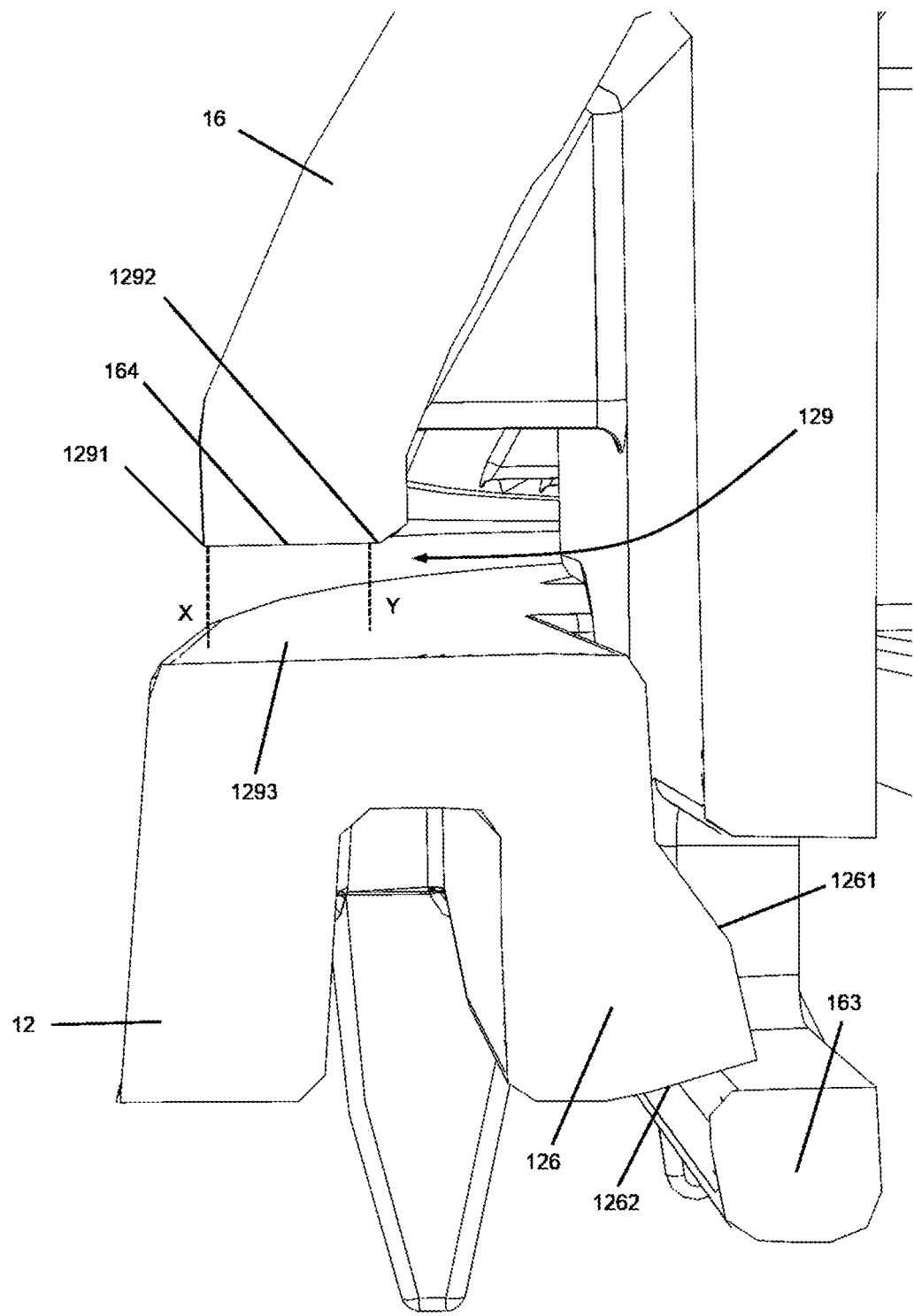
FIG. 17 is a zoomed in view of the circled portion of the assembly of FIG. 16 showing only the carrier and the lens.
Figure 18:
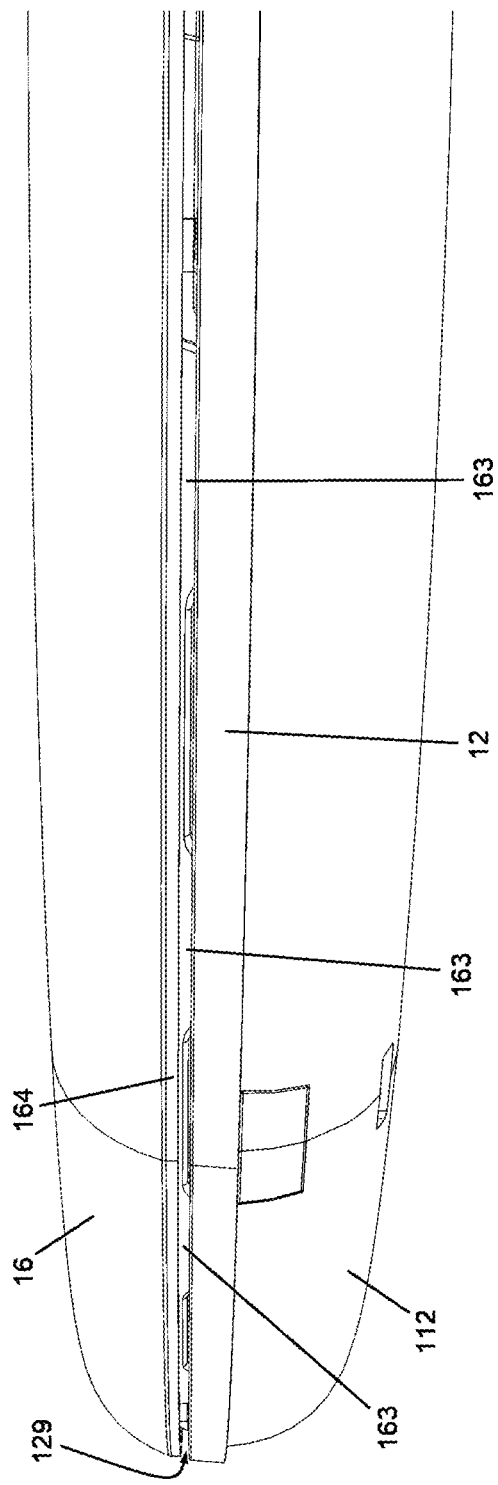
FIG. 18 is a perspective view of the assembly of FIG. 3.

Referring now to FIGS. 17-18, an arcuate shaped slot 129 may be defined between the carrier 12 and the lens 16 along the radius of curvature of the rim 11 adjacent the outer and/or inner circumference of the rim 11. As shown, for example, in FIGS. 15-16, an end portion 152 of the outer skin 15 may be tucked into the arcuate shaped slot 129. In some implementations, the end portion 152 may be tucked into the arcuate shaped slot 129 via an interference fit. In some implementations, the end portion 152 may be tucked into the arcuate shaped slot 129 and glued in place using an adhesive applied to the end portion 152, to the lens 16, and/or to the carrier 12.

The lens 16 comprises an arcuate shaped surface 164 adjacent the arcuate shaped slot 129 and the carrier 12 comprises an arcuate shaped surface 1293 adjacent the arcuate shaped slot 129. An entrance 1291 to the arcuate shaped slot 129 is defined between the arcuate shaped surfaces 164 and 1293 and has a width X as measured from the arcuate shaped surface 164 to the arcuate shaped surface 1293. Similarly, an exit 1292 to the arcuate shaped slot 129 has a width Y as measured from the arcuate shaped surface 164 to the arcuate shaped surface 1293. The width X is greater than the width Y, thereby causing the lens 16 to pinch the end portion 152 of the outer skin 15 within the arcuate shaped slot 129, improving the interference fit. In other words, the arcuate shaped surface 164 of the lens 16 tapers from the exit 1292 to the entrance 1291. In some implementations, the end surface 162 of the lens 16 has a similar taper with respect to the platform 122 and the gap 123. As used herein, an entrance to a slot or gap references a relatively outward location (toward the vehicle occupant) as compared to an exit of the slot or gap when measured along a cross-sectional radius of the steering wheel rim.

Figure 10:
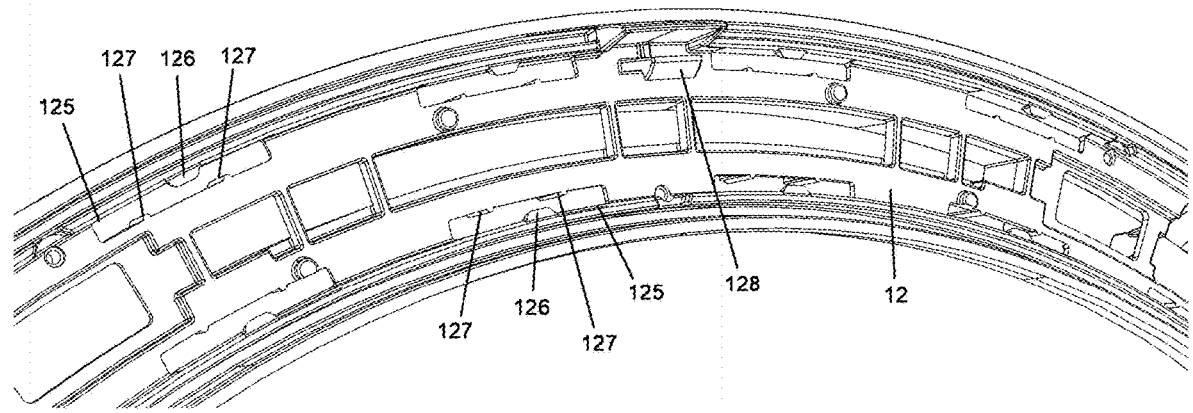
FIG. 10 is a view of a rear side of the carrier of FIG. 6.
Figure 15:
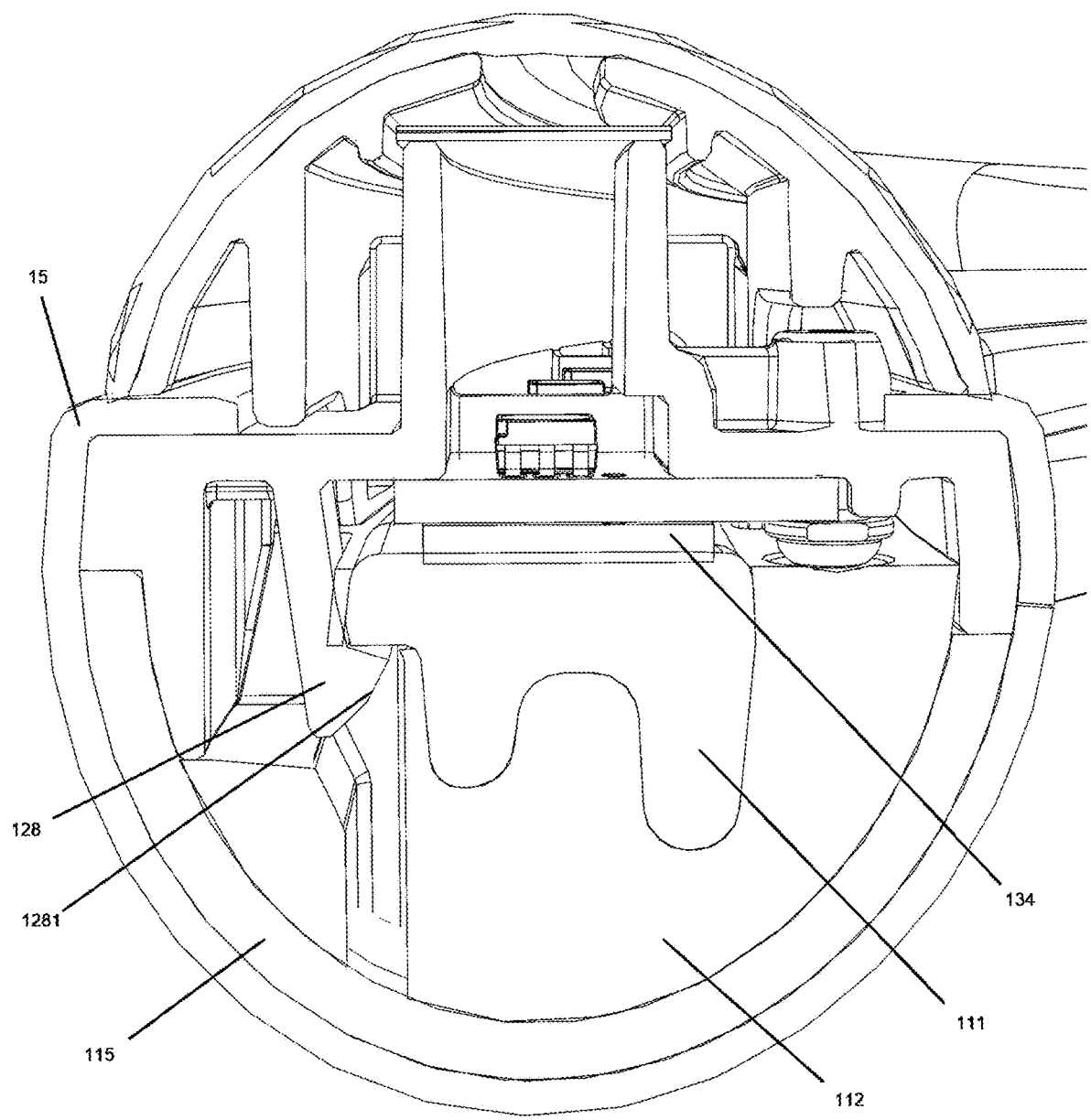
FIG. 15 is a cross sectional view of the assembly of FIG. 2 taken along the line B-B as shown in FIG. 2.
Figure 16:
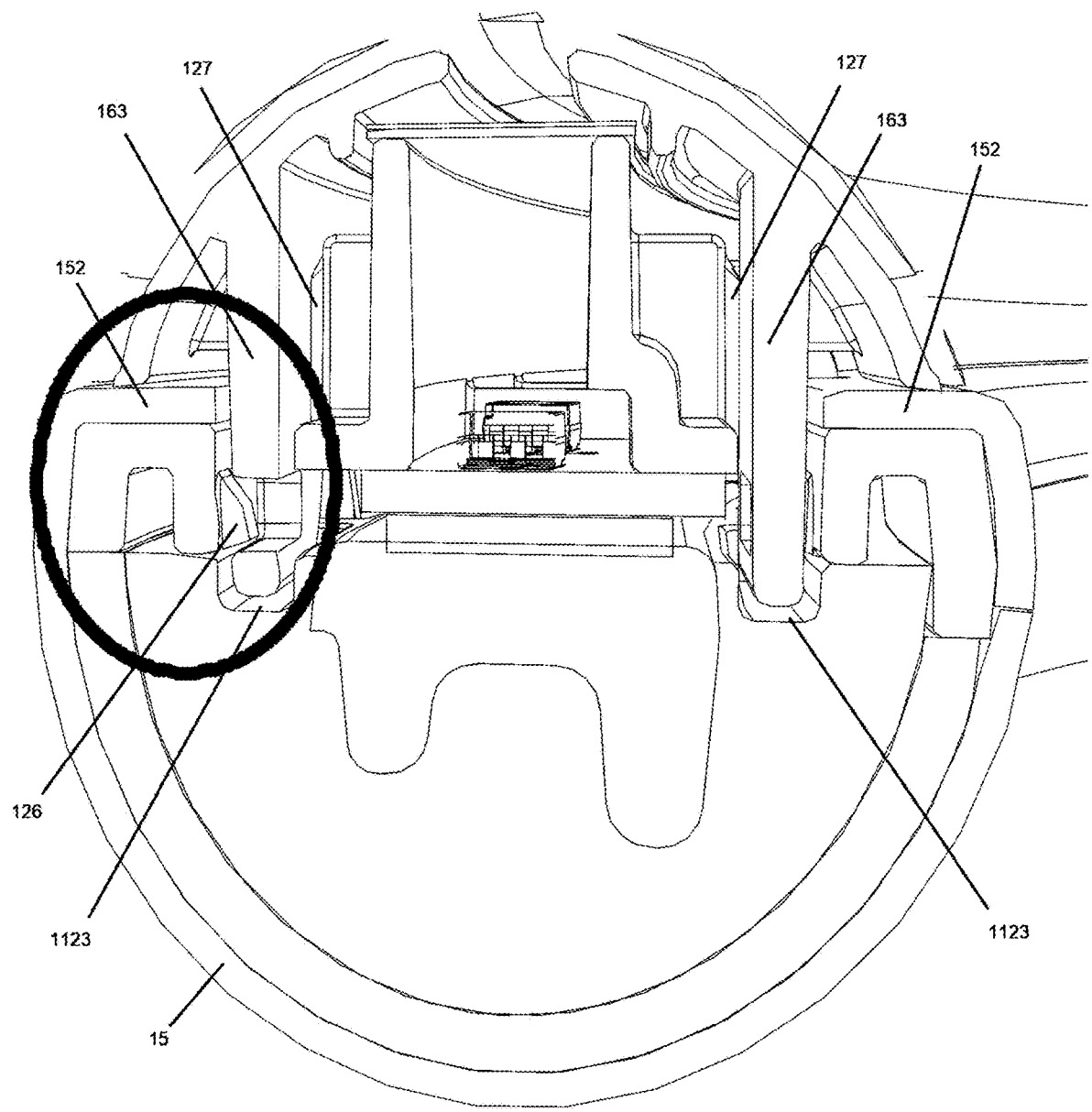
FIG. 16 is a cross sectional view of the assembly of FIG. 2 taken along the line C-C as shown in FIG. 2.

In some implementations, the carrier 12 further comprises a hook 128 for connection to the armature 111 at the twelve o'clock position, as shown in FIGS. 10 and 15. When the carrier 12 is coupled to the armature 111 via fasteners 124, the hook 128 engages with a portion of the armature 111 to further ensure a snug fit and reduce noises due to vibration, as mentioned above. Similar to the protrusion 126, the hook 128 has a ramped surface 1281 allowing for deflection of the hook 128 away from the armature 111, as the hook 128 moves along the armature 111 during installation of the carrier 12, until the ramped surface 1281 moves entirely past the armature 111, whereby the hook 128 then snaps back to lock against the armature 111. In other implementations, the hook can be at a different location along the rim, and/or there may be multiple hooks along the rim.

A number of implementations have been described. The description in the present disclosure has been presented for purposes of illustration but is not intended to be exhaustive or limited to the implementations disclosed. It will be understood that various modifications and variations will be apparent to those of ordinary skill in the art and may be made without departing from the spirit and scope of the claims. Accordingly, other implementations are within the scope of the following claims. The implementations described were chosen in order to best explain the principles of the steering wheel and lightbar assembly and their practical application, and to enable others of ordinary skill in the art to understand the steering wheel and lightbar assembly and how it may be used for various implementations with various modifications as are suited to the particular use contemplated.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated steps, features, operations, elements, and/or components, but do not preclude the presence or addition of one or more other steps, features, operations, elements, components, and/or groups thereof.

What is claimed is:

1. A steering wheel and lightbar assembly comprising:
a rim comprising an armature having a foamed portion;
a carrier coupled to the rim;
a printed circuit board (PCB) disposed between the carrier and the rim;
a light source coupled to the PCB;
a lens coupled to the carrier; and
an outer skin;
wherein the foamed portion comprises:
a first surface facing in a first direction; and
a second surface facing in a second direction, the second direction being different than the first direction;
wherein the carrier comprises a platform adjacent the second surface;
wherein a gap is defined between the lens and the platform and the outer skin is tucked into the gap.

2. The steering wheel and lightbar assembly of claim 1, wherein the second direction is perpendicular to the first direction.

3. The steering wheel and lightbar assembly of claim 1, wherein the armature further comprises a non-foamed portion and the PCB comprises a first surface and a second surface, wherein the light source is directly coupled to the first surface of the PCB and the second surface of the PCB is adjacent the non-foamed portion of the armature.

4. The steering wheel and lightbar assembly of claim 1, wherein the light source comprises a plurality of light sources.

5. The steering wheel and lightbar assembly of claim 4, wherein the plurality of light sources comprises a plurality of visible light producing light sources.

6. The steering wheel and lightbar assembly of claim 4, wherein the plurality of light sources comprises at least one infrared light producing light source.

7. The steering wheel and lightbar assembly of claim 4, wherein the plurality of light sources comprises at least one visible light producing light source and at least one infrared light producing light source.

8. The steering wheel and lightbar assembly of claim 1, wherein the carrier further comprises a tab adjacent the first surface and extending in the first direction.

9. The steering wheel and lightbar assembly of claim 8, wherein the tab comprises a protrusion and the lens comprises a mounting hole, wherein the protrusion extends into the mounting hole to couple the lens to the carrier.

10. The steering wheel and lightbar assembly of claim 9, wherein the lens further comprises an end surface adjacent the gap, wherein the outer skin is tucked between the end surface of the lens and the platform.

11. The steering wheel and lightbar assembly of claim 1, wherein the platform directly abuts the second surface.

12. The steering wheel and lightbar assembly of claim 1, wherein the carrier is coupled to a non-foamed portion of the armature.

13. The steering wheel and lightbar assembly of claim 1, wherein the foamed portion further comprises a plurality of cavities.

14. The steering wheel and lightbar assembly of claim 13, wherein the lens further comprises a plurality of clips, the plurality of clips each comprising a clip hole.

15. The steering wheel and lightbar assembly of claim 14, wherein the carrier further comprises a plurality of openings and a plurality of protrusions, at least one of the plurality of protrusions being adjacent to each of the plurality of openings.

16. The steering wheel and lightbar assembly of claim 15, wherein the plurality of clips extend through the plurality of openings and into the plurality of cavities, wherein the plurality of protrusions extend into the clip holes of the plurality of clips to couple the lens to the carrier.

17. The steering wheel and lightbar assembly of claim 16, wherein the carrier further comprises a plurality of prongs extending into the plurality of openings, the plurality of prongs directly abutting the plurality of clips.

18. The steering wheel and lightbar assembly of claim 1, wherein the carrier further comprises a hook that engages the armature.

19. The steering wheel and lightbar assembly of claim 1, wherein an arcuate shaped slot is formed between the lens and the carrier along at least a portion of a circumference of the rim, wherein the outer skin is tucked into the arcuate shaped slot.

20. The steering wheel and lightbar assembly of claim 19, wherein the lens comprises an arcuate shaped surface adjacent the arcuate shaped slot, wherein the arcuate shaped surface tapers from an exit of the arcuate shaped slot to an entrance of the arcuate shaped slot such that a width of the entrance of the arcuate shaped slot is smaller than a width of the exit of the arcuate shaped slot.

* * * * *